＝ 
US007461962B2

(12) United States Patent
Lee et al.

(10) Patent No.: US 7,461,962 B2
(45) Date of Patent: Dec. 9, 2008

(54) BACKLIGHT ASSEMBLY, DISPLAY DEVICE PROVIDED WITH THE SAME, AND METHOD THEREOF

(75) Inventors: Kyoung-Don Lee, Suwon-si (KR); Jae-Joong Kwon, Suwon-si (KR); Woo-Jun Kim, Yongin-si (KR); Sung-Kyu Shim, Seoul (KR); Hyoung-Joo Kim, Uiwang-si (KR); Jin-Sung Choi, Cheonan-si (KR); In-Sun Hwang, Suwon-si (KR); Seung-In Baek, Seoul (KR); Taek-Sun Shin, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/970,680

(22) Filed: Jan. 8, 2008

(65) Prior Publication Data

US 2008/0175023 A1    Jul. 24, 2008

(30) Foreign Application Priority Data

Jan. 22, 2007    (KR)    ........................ 10-2007-0006575
Mar. 12, 2007   (KR)    ........................ 10-2007-0023960

(51) Int. Cl.
 *F21V 8/00*    (2006.01)
(52) U.S. Cl. ...................... 362/613; 362/612; 362/555; 362/621; 362/628
(58) Field of Classification Search ................. 362/612, 362/613, 611, 621, 628, 555, 800
See application file for complete search history.

(56) References Cited

U.S. PATENT DOCUMENTS 7,036,946 B1    5/2006   Mosier

2005/0185113 A1    8/2005   Weindorf et al.
2006/0239034 A1*  10/2006  Keh et al. .................... 362/613

FOREIGN PATENT DOCUMENTS

| JP | 2002-203414 | 7/2002 |
|---|---|---|
| JP | 2002-231033 | 8/2002 |
| JP | 2002-341312 | 11/2002 |
| JP | 2005-049522 | 2/2005 |
| JP | 2005-103825 | 4/2005 |
| JP | 2006-189665 | 7/2006 |
| JP | 2006-269078 | 10/2006 |
| JP | 2006-301209 | 11/2006 |
| KR | 1020050014706 A | 2/2005 |
| KR | 1020050064364 | 6/2005 |
| KR | 20060023134 | 3/2006 |
| KR | 1020060036305 A | 4/2006 |
| KR | 1020060058596 A | 5/2006 |
| KR | 1020060065377 A | 6/2006 |
| KR | 20060090238 | 8/2006 |
| KR | 1020060088940 A | 8/2006 |

* cited by examiner

*Primary Examiner*—Laura Tso
(74) *Attorney, Agent, or Firm*—Cantor & Colburn LLP (57) ABSTRACT

A backlight assembly, usable in a display device, includes a plurality of light sources and a light guiding plate guiding light emitted from the light sources, wherein the light sources are arranged corresponding to a side of the light guiding plate and the side includes a central portion. The light sources include first light sources as a first group arranged on the central portion of the light guiding plate, and second light sources as a second group adjacent to the first group, wherein a pitch of the first light sources is smaller than a pitch of the second light sources.

25 Claims, 7 Drawing Sheets

BACKLIGHT ASSEMBLY, DISPLAY DEVICE PROVIDED WITH THE SAME, AND METHOD THEREOF

This application claims priority to Korean Patent Application Nos. 10-2007-0006575 and 10-2007-0023960, filed on Jan. 22, 2007 and Mar. 12, 2007, respectively, and all the benefits accruing therefrom under 35 U.S.C. §119, the contents of which in their entireties are herein incorporated by reference.

BACKGROUND OF THE INVENTION (a) Field of the Invention

The present invention relates to a backlight assembly, a display device provided with the same, and a method thereof. More particularly, the present invention relates to a backlight assembly having improved light efficiency, a display device having the backlight assembly, and a method thereof.

(b) Description of the Related Art

Currently, various kinds of display devices are being developed. For example, liquid crystal displays ("LCDs") having improved performance due to semiconductor techniques that are rapidly being developed are widely used as display devices.

Because the size can be greatly increased or decreased, and the weight and power consumption of an LCD can be reduced, existing cathode ray tubes ("CRTs") are being replaced by LCDs. Therefore, LCDs are being used for medium-sized or large-sized products, such as monitors and TV sets, as well as small-sized products such as cellular phones, personal digital assistants ("PDAs"), and portable multimedia players ("PMPs"). Meanwhile, since an LCD is not a self-luminous device, it needs a light source such as a light emitting diode ("LED") for supplying light.

BRIEF SUMMARY OF THE INVENTION

The present invention provides a backlight assembly having maximum light efficiency, a display device including the same, and a method thereof.

Exemplary embodiments of the present invention provide a backlight assembly that includes a plurality of light sources, and a light guiding plate guiding light emitted from the light sources. The light sources are arranged corresponding to a side of the light guiding plate, wherein the side includes a central portion, and the light sources include first light sources as a first group arranged on the central portion of the light guiding plate, and second light sources as a second group adjacent to the first group, and a pitch of the first light sources is smaller than a pitch of the second light sources.

The side of the light guiding plate may further include two corner portions disposed at respective sides of the central portion, and the first group may be closer to the central portion than the corner portions.

Distances between neighboring light sources may be gradually reduced approaching the central portion. The light sources may be disposed with mirror symmetry with respect to the central portion.

The light sources may further include third light sources as a third group, wherein the first group may be disposed between the second group and the third group, and a number of light sources of the second and the third groups is an even number. The number of second light sources may be the same as the number of third light sources.

Pitches of the second light sources may be substantially uniform, and pitches of the first light sources may be substantially uniform.

The backlight assembly may further include a display region emitting light from the light sources, wherein a first average distance between the first light sources and the display region may be smaller than a second average distance between the second light sources and the display region. Distances between the first light sources and the display region may be substantially the same, and distances between the second light sources and the display region may be reduced approaching the central portion. The light guiding plate may include at least one depressed portion, and the first light sources are disposed corresponding to the at least one depressed portion. The at least one depressed portion may include a plurality of depressed portions, and the plurality of depressed portions may become gradually closer to the display region when approaching the central portion. A ratio of the second average distance with respect to average pitches of the second light sources may be in the range of about 0.2 to about 0.5. The ratio of the second average distance with respect to the average pitches of the second light sources may be about 0.3.

The light guiding plate may include two sides, and the two sides face each other or are continuous, and at least one of the two sides faces the first light sources and the second light sources.

The light guiding plate may include at least one surface having a plurality of patterns reflecting light, and the patterns may be more densely formed approaching the central portion.

The light sources may be light emitting diodes ("LEDs"). The LEDs may be mounted on a printed circuit board ("PCB"). Each LED may include a red emitting chip, a green emitting chip, and a blue emitting chip, or a white emitting chip.

A maximum interval between the first light sources may be smaller than a maximum interval between the second light sources.

Other exemplary embodiments of the present invention provide a backlight assembly having a display region emitting light, the backlight assembly including a plurality of light sources, and a light guiding plate guiding light emitted from the light sources, wherein the light sources are arranged corresponding to a side of the light guiding plate and the side includes a central portion. The light sources are arranged at uniform intervals, and distances between the light sources and the display region are gradually reduced approaching the central portion.

The side may include at least one depressed portion, and the light sources may be disposed corresponding to the at least one depressed portion.

Still other exemplary embodiments of the present invention provide a backlight assembly that includes a plurality of LEDs including at least one light emitting chip, and a light guiding plate disposed adjacent to one side of the plurality of LEDs. The density of LEDs arranged on a central portion of one side of the light guiding plate is greater than a density of LEDs arranged on an edge portion of the one side of the light guiding plate.

Yet other exemplary embodiments of the present invention provide a display device that includes a display panel which displays images, a plurality of light sources which provides light to the display panel, and a light guiding plate which guides light emitted from the light sources. The light sources are arranged corresponding to a side of the light guiding plate, the side including a central portion, and the light sources include first light sources as a first group arranged on the central portion of the light guiding plate, and second light sources as a second group adjacent to the first group, and a pitch of the first light sources is smaller than a pitch of the second light sources.

Distances between neighboring light sources may be reduced approaching the central portion.

The display device may further include at least one reflection member provided under the light guiding plate, at least one optic sheet arranged on the light guiding plate, and at least one fixing member that receives the light guiding plate and the light sources.

Yet still other exemplary embodiments of the present invention provide a method of improving visibility of a display screen having a backlight assembly with a display region, the method including arranging a plurality of light sources adjacent a side of a light guiding plate, the side including a central portion, such that first light sources in a first group are arranged on the central portion of the light guiding plate and second light sources in a second group are arranged adjacent to the first group, wherein arranging the plurality of light sources includes at least one of arranging the first light sources with a smaller pitch than a pitch of the second light sources, and arranging the first light sources with a first average distance from the display region smaller than a second average distance between the second light sources and the display region.

BRIEF DESCRIPTION OF THE DRAWINGS

The above and other features and advantages of the present invention will become apparent and more readily appreciated from the following description of the exemplary embodiments, taken in conjunction with the accompanying drawings, in which.

DETAILED DESCRIPTION OF THE INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The same reference numerals designate the same or similar elements throughout the drawings.

It will be understood that when an element such as a layer, film, region, or substrate is referred to as being "on" another element, it can be directly on the other element or intervening elements may also be present. In contrast, when an element is referred to as being "directly on" another element, there are no intervening elements present. As used herein, the term "and/or" includes any and all combinations of one or more of the associated listed items.

It will be understood that, although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section described below could be termed a second element, component, region, layer, or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and "comprising", when used in this specification, specify the presence of stated features, integers, steps, operations, elements, and/or components, but do not preclude the presence or addition of one or more other features, integers, steps, operations, elements, components, and/or groups.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different meanings of the device in use or operation in addition to the intention depicted in the figures. For example, if the device in the figures is turned upside down, elements described as "below" or "beneath" other elements or features would then be oriented "above" the other elements or features. Thus, the exemplary term "below" can encompass both orientations of above and below. The device may be otherwise rotated 90 degrees or to other orientations and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the invention are described herein with reference to perspective and cross-section illustrations that are schematic illustrations of idealized embodiments of the invention. As such, variations from the shapes of the illustrations as a result, for example, of manufacturing techniques and/or specifications, are to be expected. Thus, embodiments of the invention should not be construed to be limited to the particular shapes of regions illustrated herein but are to include deviations in shapes that result, for example, from manufacturing. For example, a region that is illustrated as flat or is described as a flat region may be typically rough and/or have non-linear features. Also, a part illustrated with a sharp edge may be rounded. Thus, the regions illustrated in the figures are schematic in nature and their shapes are not intended to illustrate the actual shape of a region of a device and are not intended to limit the scope of the invention.

Figure 1:
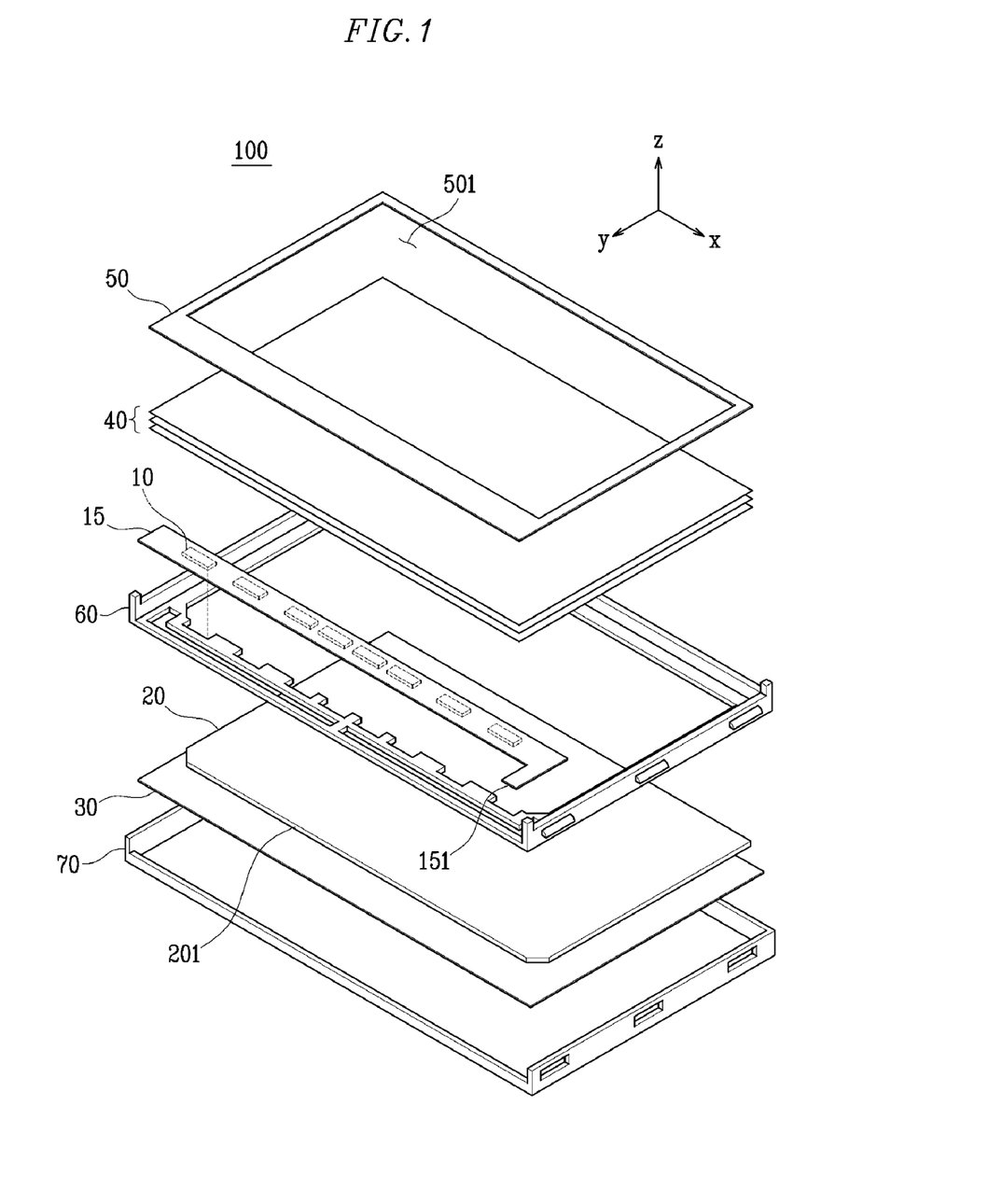
FIG. 1 is an exploded perspective view schematically illustrating an exemplary backlight assembly according to a first exemplary embodiment of the present invention.
Figure 2:
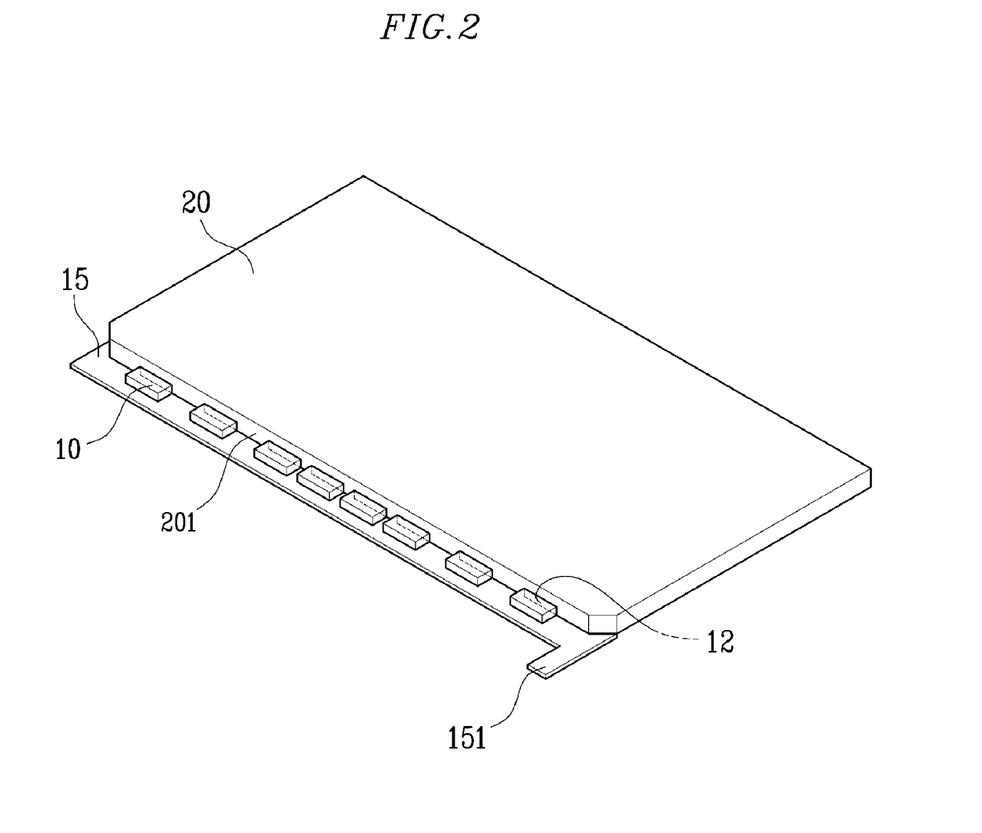
FIG. 2 is a combined perspective view of a light source, a flexible printed circuit film and a light guiding plate in FIG. 1.

FIG. 1 is an exploded perspective view schematically illustrating an exemplary backlight assembly 100 according to a first exemplary embodiment of the present invention, and FIG. 2 is a combined perspective view of a light source 10, a flexible printed circuit film 15 and a light guiding plate 20 in FIG. 1. The backlight assembly 100 according to the present invention may be used for electronic products such as, but not limited to, a personal digital assistant ("PDA") and a portable multimedia player ("PMP").

Referring to FIGS. 1 and 2, the backlight assembly 100 includes the light source 10 (indicated by a dotted line) and the light guiding plate 20. Further, the backlight assembly 100 includes a reflecting sheet 30 disposed under the light guiding plate 20, optic sheets 40 disposed on the light guiding plate 20, an adhesive member 50, and a first fixing member 60 and a second fixing member 70 for fixing or receiving the above-mentioned components.

A light emitting diode ("LED") may be used as the light source 10. It is easy to reduce the size of an LED, so LEDs are suitable for a light source of a display device of small or middle size. The LED may include at least one of a red emitting chip, a green emitting chip, and a blue emitting chip, and the LED may emit white light including red light, green light, and blue light. Also, the LED may include a white emitting chip for emitting white light, and may further include a power supply terminal for supplying power to the emitting chips and a molding member for sealing the emitting chips.

The light sources 10 are mounted on an upper surface of the flexible printed circuit ("FPC") film 15 fixed to the first fixing member 60, and the FPC film 15 is electrically connected to the light sources 10 through a plurality of signal line patterns formed on the FPC film 15. Accordingly, the FPC film 15 receives the driving voltage from the outside through a connection portion 151 and may drive the light sources 10. Light is emitted from light emitting surface 12 of the surfaces of the light sources 10. The light emitting surface 12 is perpendicular to the upper surface of the FPC film 15. Alternatively, the light sources 10 may be mounted on a metal core printed circuit board ("MCPCB"), and an insulating layer or a light reflection layer may be coated on one surface on which the light sources 10 are mounted.

Eight light sources 10 are shown in FIGS. 1 and 2, but these are intended to exemplify the number of the LEDs, and thus the present invention is not limited to these. The light sources 10 may be formed in various numbers.

The light sources 10 are arranged to face the side surface 201 of the light guiding plate 20. Specifically, the light emitting surface 12 and the side surface 201 of the light guiding plate 20 face each other. Accordingly, light emitted from the light emitting surface 12 is directly incident to the side surface 201 of the light guiding plate 20, and the light guiding plate 20 guides the emitted light and uniformly diffuses it on the whole surface on the light guiding plate 20. The diffused light proceeds toward the optic sheets 40 in the Z-axis direction. A plurality of patterns are formed on a side surface, such as a lower surface, of the light guiding plate 20 facing the reflecting sheet 30 such that the light emits toward the optic sheets 40 in the Z-axis direction. Also, the reflecting sheet 30 reflects the light emitted from the guiding plate 20 in the Z axis direction. Accordingly, a loss of light may be minimized.

The brightness and the uniformity of the light emitted from the light guiding plate 20 is enhanced by passing through the optic sheets 40, and the light with improved brightness and uniformity emits out the backlight assembly 100 as sheet light.

Figure 3:
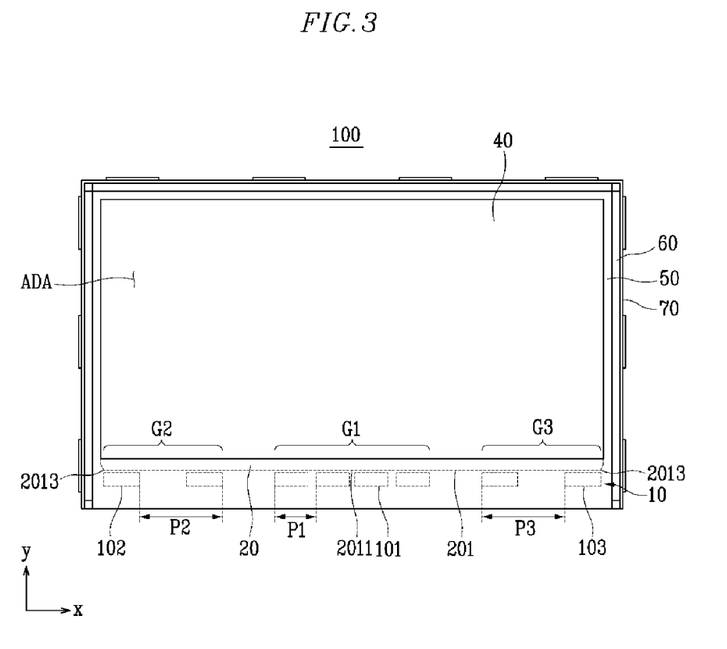
FIG. 3 is a plan view illustrating the exemplary backlight assembly shown in FIG. 1.

The adhesive member 50 is disposed on the optic sheets 40. The backlight assembly 100 may be independently used, or may be used as a light source of a non-emissive display panel. Accordingly, the adhesive sheet 50 may be used to adhere the backlight assembly 100 to the non-emissive display panel, and a pressure sensitive adhesive ("PSA") may be used as the adhesive sheet 50. An adhesive material in the PSA is uniformly dispersed by being pressed, such that it is possible to fix the backlight assembly 100 to a display panel by pressing the adhesive sheet 50. An opening 501 formed in the adhesive sheet 50 faces an active display area ("ADA" as shown in FIG. 3) for emitting the light.

The first fixing member 60 receives the light guiding plate 20, the FPC film 15, the optic sheets 40, and the adhesive sheet 50. The reflecting sheet 30 is fixed under the first fixing member 60, and is enclosed and fixed by using the second fixing member 70. Because the first fixing member 60 directly contacts the internal components of the backlight assembly 100, the first fixing member 60 is formed of a material having low intensity to prevent the internal components of the backlight assembly 100 from breaking by contact therebetween due to the external impacts. For example, the first fixing member 60 may be made of resin.

Meanwhile, the second fixing member 70 is formed of a material having high intensity to protect the internal components of the backlight assembly 100 from external impacts. For example, the second fixing member 70 may be made of metal such as stainless use steel ("SUS").

As shown in FIGS. 1 and 2, the intervals between the pluralities of light sources 10 are different in the exemplary embodiment according to the present invention. The plurality of light sources 10 are dense in the central portion of the light guiding plate 20, as compared to light sources 10 adjacent end portions of the light guiding plate 20. Viewers tend to view the central potion of the display screen more than the edge portion of the display screen. Accordingly, the brightness of the central portion of the display screen is more important. Therefore, it is more preferable to improve the brightness of the central portion of the display area than to control the brightness of the whole display area to be uniform. That is to say, it is effective for the brightness of the central portion of the display area to be improved. By using these exemplary methods according to the exemplary embodiment of the present invention, the visibility of the backlight assembly 100 may be improved and the number of light sources 10 may be minimized, which will be further described with reference to FIG. 3.

FIG. 3 is a plan view illustrating the exemplary backlight assembly shown in FIG. 1, and shows the backlight assembly 100 of FIG. 1 in an assembled state. Because the light sources 10 and the light guiding plate 20 are received in the backlight assembly 100, they are indicated by dotted lines.

As shown in FIG. 3, the light sources 10 are classified into first to third groups G1, G2, and G3 depending on the arrangement areas and their locations with respect to the light guiding plate 20. The side surface 201 of the light guiding plate 20 includes a central portion 2011 between corner portions 2013. A group of light sources 101 that are arranged on the central portion 2011 is defined as the first group G1, and the remaining light sources 102 and 103 that are arranged at the corner portions 2013 are defined as the second and third groups G2 and G3. The second and third groups G2 and G3 are disposed at respective sides of the first group G1. The first group G1 is disposed adjacent to the central portion 2011 of the light guiding plate 20, and the second and third groups G2 and G3 are disposed adjacent to the corner portions 2013 of the light guiding plate 20.

As shown in FIG. 3, the first pitch P1 of the light sources 101 of the first group G1 is different from the second pitch P2 of the light sources 102 of the second group G2 and the third pitch P3 of the light sources 103 of the third group G3. The arrangements of the light sources 101 may be non-uniform such that the brightness of the backlight assembly 100 may be improved.

The first pitch P1 is smaller than the second and third pitches P2 and P3. That is to say, the first light sources 101 adjacent to the central portion 2011 are closer to each other than are the second and third light sources 102 and 103 that are respectively adjacent to the corner portions 2013. Accordingly, more light may be provided at the central portion 2011 of the light guiding plate 20 such that the brightness of the central portion of the active display area ADA may be improved.

The intervals between the light sources 101, 102, and 103 may further have mirror-symmetry with respect to the central position of the side surface 201 of the light guiding plate 20. The central position of the side surface 201 of the light guiding plate 20 is a position where the side surface 201 of the light guiding plate 20 is bisected.

The first, second, and third light sources 101, 102, and 103 may be respectively arranged with uniform intervals in the respective first, second, and third groups G1, G2, and G3. That is to say, the first, second, and third pitches P1, P2, and P3 may be uniform in the first to third groups G1, G2, and G3, respectively, such that the brightness of the light emitted by the backlight assembly 100 may be uniform. However, each interval between the light sources 101, 102, and 103 may be changed by a process margin. Even if this occurs, because the process margin is trivial, the average of the first pitch P1 is still smaller than that of the second and third pitches P2 and P3.

The brightness of the corner portions 2013 of the light guiding plate 20, excluding the central portion 2011, may be uniform by providing the same amount of light. Accordingly, the number of second light sources 102 of the second group G2 is the same as that of the third light sources 103 of the third group G3. In FIG. 3, the number of the second and third light sources 102 and 103 is two, however an alternate number of second and third light sources 102 and 103 may be used. Regardless of whether the number of each of the second and third light sources 102 and 103 is even or odd, the total number of the second and third light sources 102 and 103 is even.

Figure 4:
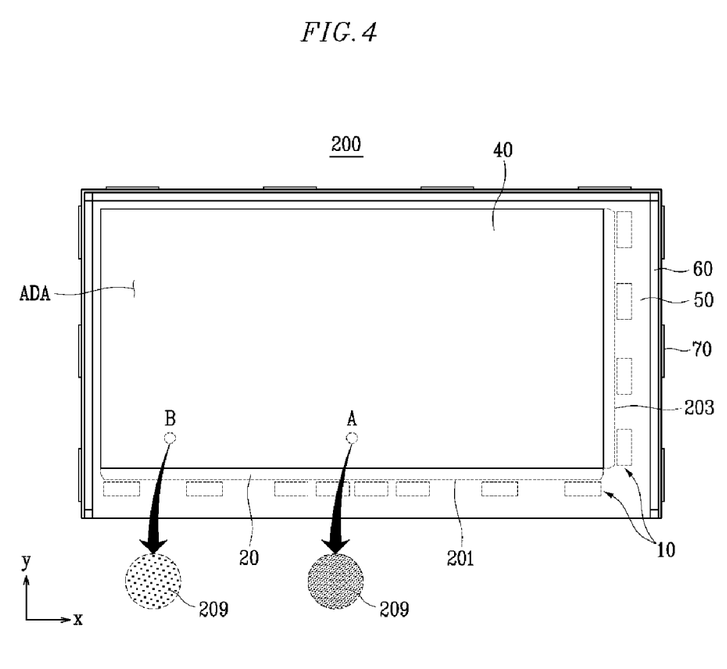
FIG. 4 is a plan view schematically illustrating an exemplary backlight assembly according to a second exemplary embodiment of the present invention.

FIG. 4 is a plan view schematically illustrating an exemplary backlight assembly according to a second exemplary embodiment of the present invention. Areas A and B are enlarged to show views of patterns 209 that are formed on the lower surface of the light guiding plate 20 that faces the reflecting sheet 30. Because the structure of the backlight assembly 200 is almost the same as the structure of the backlight assembly 100 of FIG. 1, the same numerals for the same components are used, and descriptions thereof are omitted.

As shown in FIG. 4, the light sources 10 are arranged according to the two side surfaces 201 and 203 of the light guiding plate 20. The two side surfaces 201 and 203 are connected to each other and respectively extend in X-axis and Y-axis directions. Because the light sources 10 are arranged according to the two connected side surfaces 201 and 203 of the light guiding plate 20, a display screen having high brightness may be obtained.

A plurality of patterns 209 formed on the lower surface of the light guiding plate 20 reflect the light emitted from the light sources 10, and the reflected light emits through the active display area ADA. As shown in FIG. 4, the patterns 209 of the A portion are more densely arranged than the patterns 209 of the B portion. That is to say, the patterns 209 become denser approaching the central portion of the light guiding plate 20. Of course, the patterns 209 may be formed on the upper surface of the light guiding plate 20, and the light guiding plate 20 may be formed of a material having good transmittance and integrity against deformation or breakage, for example polymethyl methacrylate ("PMMA").

As described above, the patterns 209 become denser toward the central portion of the light guiding plate 20. Accordingly, the light guiding plate 20 reflects the light emitted from the light sources 10, and the reflected light having good brightness may emit through the active display area ADA to the outside. As a result of the increased pattern density toward the central portion of the light guiding plate 20, light having improved brightness may emit at the central portion of the backlight assembly 200.

Figure 5:
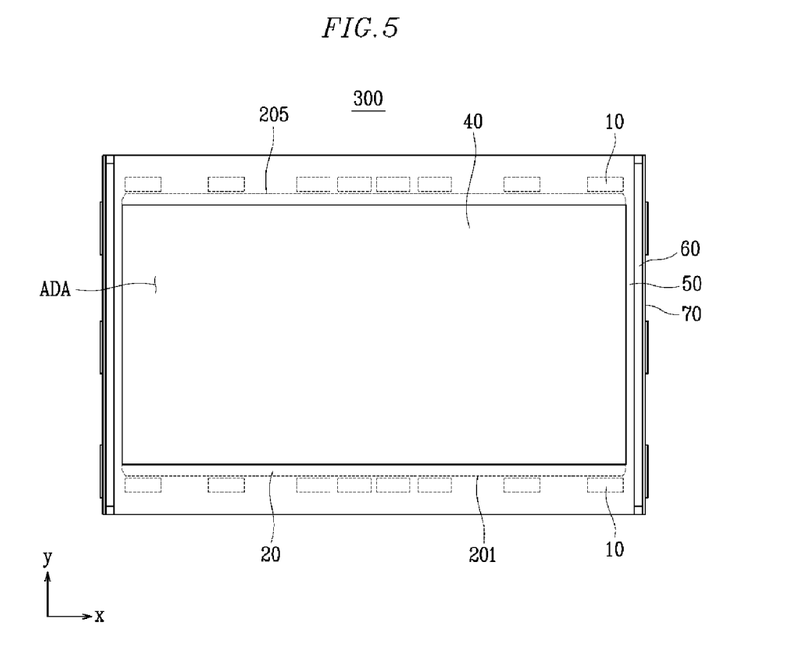
FIG. 5 is a plan view schematically illustrating an exemplary backlight assembly according to a third exemplary embodiment of the present invention.

FIG. 5 is a plan view schematically illustrating an exemplary backlight assembly according to a third exemplary embodiment of the present invention. Because the plan structure of the backlight assembly 300 is almost the same as the plan structure of the backlight assembly 100 of FIG. 3, the same numerals for the same components are used, and descriptions thereof are omitted.

As shown in FIG. 5, the light sources 10 that are densely arranged on the central portion may be symmetrically arranged. That is to say, the light guiding plate 20 has opposing side surfaces 201 and 205 that are extended in the X-axis direction and face each other. The light sources 10 are arranged along both side surfaces 201 and 205 such that the light having improved brightness is emitted though the central portion of the backlight assembly 300 to the outside.

Figure 6:
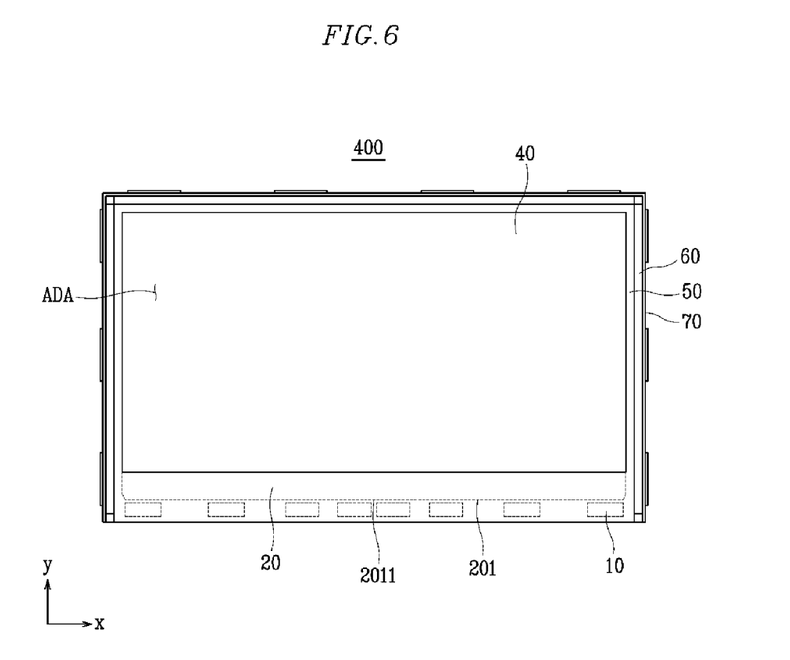
FIG. 6 is a plan view schematically illustrating an exemplary backlight assembly according to a fourth exemplary embodiment of the present invention.

FIG. 6 is a plan view schematically illustrating an exemplary backlight assembly according to a fourth exemplary embodiment of the present invention. Because the plan structure of the backlight assembly 400 is almost the same as the plan structure of the backlight assembly 100 of FIG. 3, the same numerals for the same components are used, and descriptions thereof are omitted.

As shown in FIG. 6, the light sources 10 are arranged on one side surface 201 of the light guiding plate 20. The intervals between adjacent light sources 10 are gradually reduced toward the central portion 2011. That is to say, the density of the light sources 10 that are positioned closer to the central portion 2011 is higher than that of the light sources 10 that are positioned nearer the edge portions. Also, a first half of the light sources 10 may be symmetrically arranged with a second half of the light sources 10. Accordingly, because the light sources 10 are more densely arranged on the central portion 2011, the light having improved brightness may be emitted though the central portion of the backlight assembly 400 to the outside.

Figure 7:
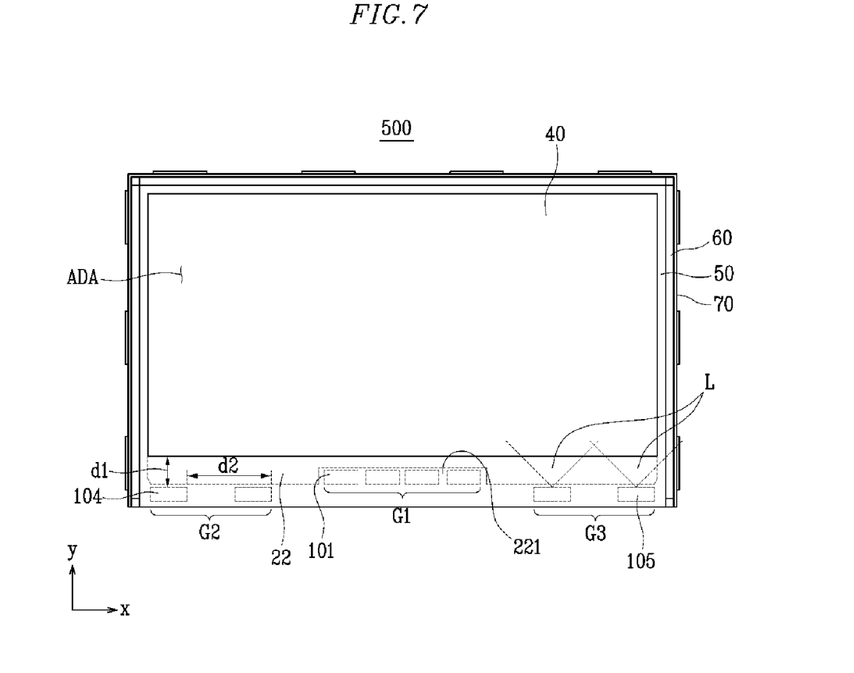
FIG. 7 is a plan view schematically illustrating an exemplary backlight assembly according to a fifth exemplary embodiment of the present invention.

FIG. 7 is a plan view schematically illustrating an exemplary backlight assembly according to a fifth exemplary embodiment of the present invention. Because the plan structure of the backlight assembly 500 is almost the same as the plan structure of the backlight assembly 100 of FIG. 3, the same numerals for the same components are used, and descriptions thereof are omitted.

As shown in FIG. 7, the light guiding plate 22 (dotted line) has a depressed portion 221 formed on the one side of the light guiding plate 22 where the light sources 101 are arranged. In other words, the light guiding plate 22 is indented at a central portion of the light incident surface of the light guiding plate 22. Accordingly, the light sources 101 of the first group GI are closer to the active display area ADA than are the light sources 104 and 105 of the second and third groups G2 and G3, where the first group G1 is located between the second and third groups G2 and G3. The distances between the light sources 101 and the active display area ADA in the first group G1 are uniform, and accordingly the light having uniform brightness may be provided on the central portion of the active display area ADA. Also, as shown in FIG. 7, the distances between the light sources 104 and 105 and the active display area ADA in the second and third groups G2 and G3 are respectively uniform.

However, the invention is not limited to the above-described exemplary embodiments. The distances between the light sources and the active display area ADA may be different within the same groups. But, when considering the average distances between the respective light sources 101, 104, and 105 and the active display area ADA, the average distances between the light sources 101 and the active display area ADA are less than the average distances between the light sources 104 and 105 and the active display area ADA.

Because the light sources 101 of the first group G1 are closer to the central portion of the active display area ADA, the brightness may be improved in the central portion of the display region. Furthermore, the pitches of the light sources 104 and 105 may be larger than that of the light sources 101, and the light sources 104 and 105 are further than the light sources 101 from the active display area ADA. A dark portion may not be generated in the active display area ADA. As shown in the right side of FIG. 7, the light L emitted from the light sources 105 are overlapped with the edge of the active display area ADA such that a dark portion may be prevented from occurring in the active display area ADA.

To prevent the generation of a dark portion, it is preferable that the ratio of the average distance d1 between the light sources 104 and the active display area ADA with respect to the average pitch d2 between the light sources 104 is in the range of about 0.2 to about 0.5. When the average pitch d2 between the light sources 104 is excessively large or when the average distance d1 between the light sources 104 and the active display area ADA is excessively small, a dark portion may be generated. On the contrary, if the average pitch d2 between the light sources 104 is excessively small or the average distance d1 between the light sources 104 and the active display area ADA is excessively large, the brightness of the active display area ADA is reduced. Practically, it is preferable that the ratio of the average distance d1 with respect to the average pitch d2 is substantially about 0.3.

Figure 8:
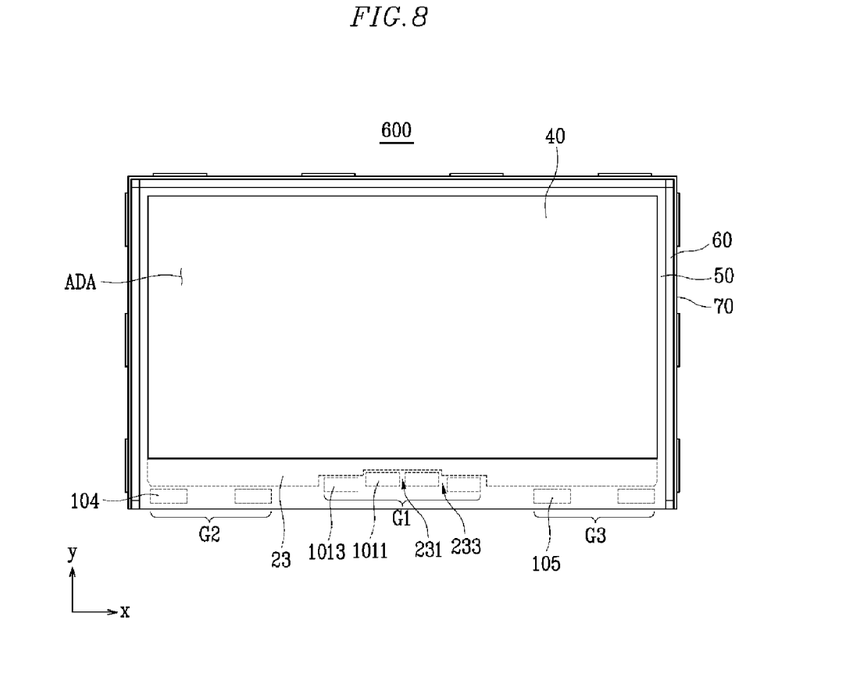
FIG. 8 is a plan view schematically illustrating an exemplary backlight assembly according to a sixth exemplary embodiment of the present invention.

FIG. 8 is a plan view schematically illustrating an exemplary backlight assembly according to a sixth exemplary embodiment of the present invention. Because the plan structure of the backlight assembly 600 is almost the same as the plan structure of the backlight assembly 500 of FIG. 7, the same numerals for the same components are used, and descriptions thereof are omitted.

As shown in FIG. 8, the light guiding plate 23 (dotted line) has a plurality of depressed portions 231 and 233, and the light sources 1011 and 1013 are respectively disposed in the depressed portions 231 and 233. In other words, the light guiding plate 23 is indented with stepped portions that are symmetrically arranged with respect to a central region of the light incident surface of the light guiding plate 23, with the greatest indentation being centrally located. The depressed portions 231 and 233 are closer to the active display area ADA when approaching the central portion of the light guiding plate 23. Accordingly, the light having improved brightness may be emitted through the central portion of the display region.

Figure 9:
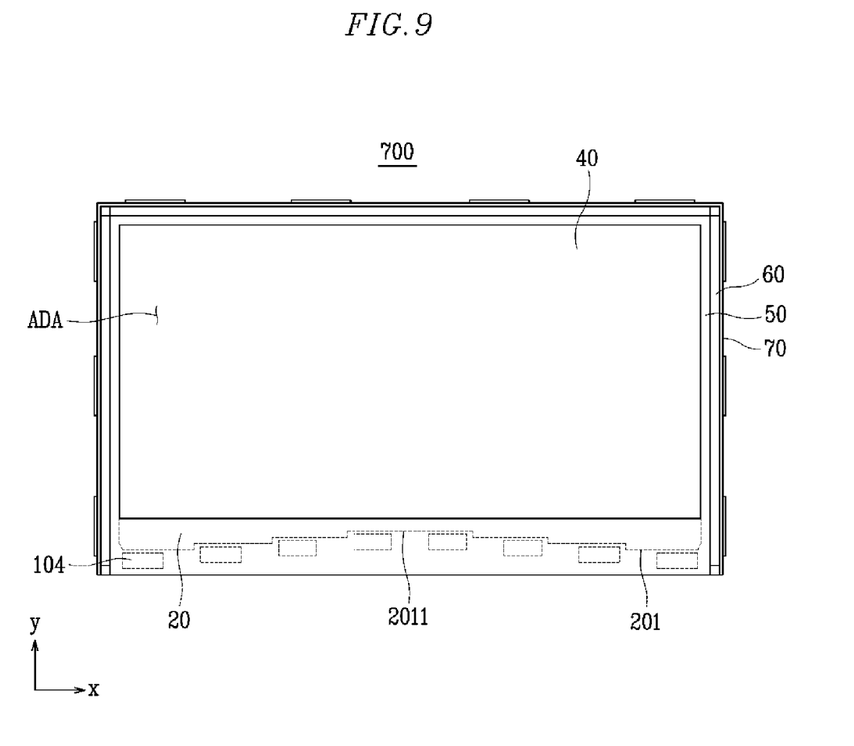
FIG. 9 is a plan view schematically illustrating an exemplary backlight assembly according to a seventh exemplary embodiment of the present invention; and, FIG. 10 is an exploded perspective view schematically illustrating an exemplary display device including to the exemplary backlight assembly shown in FIG. 1.

FIG. 9 is a plan view schematically illustrating an exemplary backlight assembly according to a seventh exemplary embodiment of the present invention. Because the plan structure of the backlight assembly 700 is almost the same as the plan structure of the backlight assembly 500 of FIG. 7, the same numerals for the same components are used, and descriptions thereof are omitted.

As shown in FIG. 9, a plurality of light sources are substantially disposed with uniform intervals therebetween. The light sources 10 are positioned gradually closer to the active display area ADA as they approach the central portion 2011 of side surface 201 of the light guiding plate 20. Accordingly, because the light sources 10 are positioned gradually closer to the active display area ADA towards the central portion 2011 of side surface 201, the brightness of the backlight assembly 700 may be improved. The light guiding plate 20 is manufactured to include steps on the side surface 201 of the light guiding plate 20.

Figure 10:
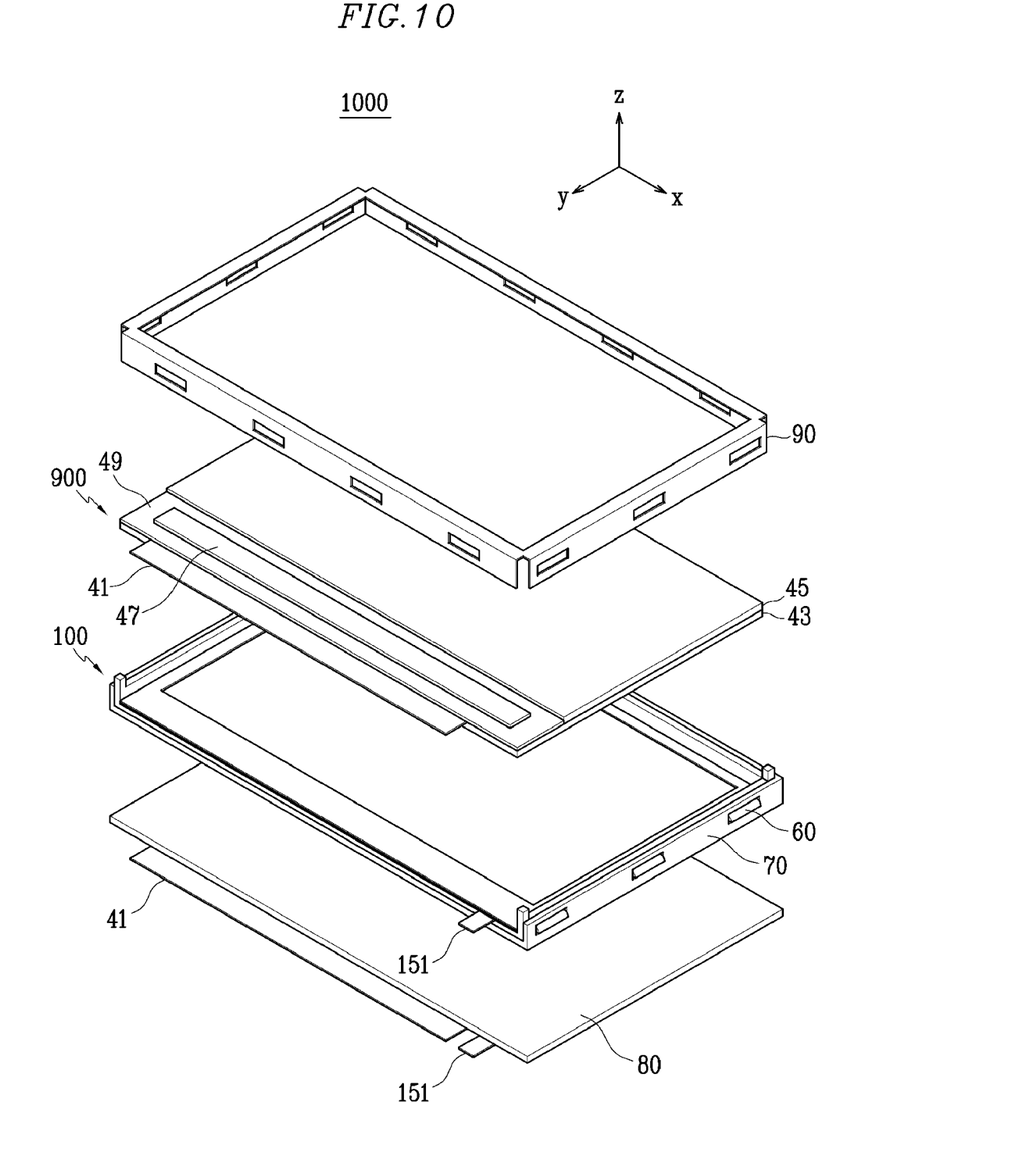

FIG. 10 is an exploded perspective view schematically illustrating an exemplary display device including the exemplary backlight assembly shown in FIG. 1.

A display device 1000 includes a display panel 900, and a backlight assembly 100 for providing light toward the display panel 900. For example, a liquid crystal display ("LCD") panel or a non-self-luminous display panel may be used as the display panel 900. The display panel 900 is electrically connected to a printed circuit board ("PCB") 80 through a flexible printed circuit ("FPC") film 41. Even though the FPC film 41 is discontinuous in FIG. 10, the ends of the FPC film 41 are substantially continuous. Further, even though the connection portion 151 is illustrated as discontinuous in FIG. 10, the end of the connection portion 151 is substantially continuous. Therefore, the light sources 10 (shown in FIG. 1) can receive the driving signal from the connection portion 151 of the PCB 80.

The display panel 900 includes a thin film transistor ("TFT") panel 43, a color filter panel 45, and liquid crystal (not shown) injected between the two panels 43 and 45. The TFT panel 43 faces the color filter panel 45 and has a plurality of TFTs that are formed thereon in a matrix shape. Source terminals of the TFTs on the TFT panel 43 are connected to a plurality of data lines, and gate terminals of the TFTs are connected to a plurality of gate lines. Further, a plurality of pixel electrodes that are formed of a conductive and transparent material, such as indium tin oxide ("ITO"), are connected to drain terminals of the TFTs.

The data lines and the gate lines of the TFT panel 43 are connected to the PCB 80. Therefore, when an electrical signal is input from the PCB 80, the electrical signal is input to the source and gate terminals of the TFTs. Each of the TFTs is turned on or off on the basis of the electrical signal such that the electrical signal required for pixel formation is output to the drain terminal of the corresponding TFT. An integrated circuit ("IC") chip 47 is mounted on the TFT panel 43 and controls the display panel 900. The IC chip 47 generates a plurality of timing signals for applying data driving signals and gate driving signals with predetermined timing, and applies the generated timing signals to the data lines and gate lines of the display panel 900. A passivation layer 49 is coated around the IC chip 47 so as to protect the IC chip 47.

The color filter panel 45 is disposed on the TFT panel 43. The color filter panel 45 is a substrate having a plurality of color pixels, defined by color filters, that is, R, G, and B pixels, that are formed by a thin film process and that transmit light such that predetermined colors are displayed. ITO, or other transparent and conductive material, is coated on the entire surface of the color filter panel 45 to form a common electrode. When power is supplied to the gate and source terminals of a TFT such that the TFT is turned on, an electric field is formed between the pixel electrode and the common electrode of the color filter substrate. The electric field changes the orientation angle of the liquid crystal injected between the TFT panel 43 and the color filter panel 45, and the transmittance of the liquid crystal is changed according to the changed orientation angle, thereby obtaining a desired pixel. Polarizers (not shown) are attached to both surfaces of the display panel 900 and polarize light passing through the display panel 900.

The display panel 900 is fixed on the backlight assembly 100 and a third fixing member 90 covers the display panel 900. The third fixing member 90 is combined to the first fixing member 60 and is adhered to the side of the second fixing member 70. Accordingly, the display device 1000 may firmly receive the display panel 900 while the PCB 80 is disposed under the second fixing member 70.

While the display device 1000 has been described as containing the backlight assembly 100, the display device 1000 may alternatively include any of the other above-described exemplary embodiments of a backlight assembly, or any combination thereof.

As described above, the light sources are effectively arranged such that the brightness may be improved in the central portion of the display region. As a result, the visibility may be improved and an image screen having high resolution may be obtained.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A backlight assembly comprising:
   a printed circuit board;
   a plurality of light sources mounted on an upper surface of the printed circuit board and having a light emitting surface; and
   a light guiding plate guiding light emitted from the light sources,
   wherein the light emitting surface of the light sources is substantially perpendicular to the upper surface of the printed circuit board and faces a side of the light guiding plate,
   the side of the light guiding plate includes a central portion,
   the light sources include first light sources as a first group arranged on the central portion of the light guiding plate and second light sources as a second group adjacent to the first group, and
   a pitch of the first light sources is smaller than a pitch of the second light sources.

2. The backlight assembly of claim 1, wherein light emitted from the light emitting surface is directly incident to the side of the light guiding plate.

3. The backlight assembly of claim 2, further comprising a display region emitting light from the light sources, and wherein a first average distance between the first light sources and the display region is smaller than a second average distance between the second light sources and the display region.

4. The backlight assembly of claim 3, wherein distances between the first light sources and the display region are substantially same.

5. The backlight assembly of claim 3, wherein distances between the second light sources and the display region are reduced approaching the central portion.

6. The backlight assembly of claim 5, wherein the light guiding plate includes at least one depressed portion, and the first light sources are disposed corresponding to the at least one depressed portion.

7. The backlight assembly of claim 6, wherein the at least one depressed portion includes a plurality of depressed portions, and the plurality of depressed portions become gradually closer to the display region toward the central portion.

8. The backlight assembly of claim 3, wherein a ratio of the second average distance with respect to average pitches of the second light sources is in a range of about 0.2 to about 0.5.

9. The backlight assembly of claim 8, wherein the ratio of the second average distance with the respect to the average pitches of the second light sources is about 0.3.

10. The backlight assembly of claim 1, wherein distances between neighboring light sources are gradually reduced approaching the central portion.

11. The backlight assembly of claim 10, wherein the light sources are disposed in mirror symmetry with respect to the central portion.

12. The backlight assembly of claim 1, wherein the light sources further include third light sources as a third group,
   wherein the first group is disposed between the second group and the third group, and a sum of the light sources of the second and third groups is an even number.

13. The backlight assembly of claim 12, wherein a number of second light sources is equal to a number of third light sources.

14. The backlight assembly of claim 1, wherein pitches of the second light sources are substantially uniform.

15. The backlight assembly of claim 14, wherein pitches of the first light sources are substantially uniform.

16. The backlight assembly of claim 1, wherein the light guiding plate includes two sides and the two sides face each other or are continuous, and at least one of the two sides faces the first light sources and the second light sources.

17. The backlight assembly of claim 1, wherein the light guiding plate includes at least one surface having a plurality of patterns reflecting the light, and the patterns are more densely formed approaching the central portion.

18. The backlight assembly of claim 1, wherein the light sources are light emitting diodes.

19. The backlight assembly of claim 1, wherein a maximum interval between the first light sources is smaller than a maximum interval between the second light sources.

20. A backlight assembly having a display region emitting light, the backlight assembly comprising:
   a plurality of light sources; and
   a light guiding plate guiding light emitted from the light sources,
   wherein the light sources are arranged corresponding to a side of the light guiding plate and the side includes a central portion, and
   the light sources are arranged at uniform intervals, and distances between the light sources and the display region are gradually reduced approaching the central portion.

21. The backlight assembly of claim 20, wherein the side includes at least one depressed portion, and the light sources are disposed corresponding to the at least one depressed portion.

22. A display device comprising:
a display panel which displays images;
a plurality of light sources mounted on an upper surface of a printed circuit board and providing light to the display panel; and
a light guiding plate which guides light emitted from the light sources,
wherein the light sources have a light emitting surface substantially perpendicular to the upper surface of the printed circuit board,
the light emitting surface faces a side surface of the light guiding plate,
the side surface of the light guiding plate includes a central portion,
the light sources include first light sources as a first group arranged on the central portion of the light guiding plate, and second light sources as a second group adjacent to the first group, and
a pitch of the first light sources is smaller than a pitch of the second light sources.

23. The display device of claim 22, wherein distances between neighboring light sources are reduced approaching the central portion.

24. The display device of claim 22, further comprising:
at least one reflection member provided under the light guiding plate;
at least one optic sheet arranged on the light guiding plate; and
at least one fixing member receiving the light guiding plate and the light sources.

25. A method of improving visibility of a display screen having a backlight assembly with a display region, the method comprising:
arranging a plurality of light sources adjacent a side of a light guiding plate, the side including a central portion, such that first light sources in a first group are arranged on the central portion of the light guiding plate and second light sources in a second group are arranged adjacent to the first group;
wherein arranging the plurality of light sources includes at least one of arranging the first light sources with a smaller pitch than a pitch of the second light sources, and arranging the first light sources with a first average distance from the display region smaller than a second average distance between the second light sources and the display region.

* * * * *